United States Patent [19]

Bembenek

[11] 4,108,033
[45] Aug. 22, 1978

[54] ROTARY CUTTING DEVICE FOR FORMING STRIPS OF SHAPED ARTICLE PREFORMS

[75] Inventor: William E. Bembenek, Dallas, Tex.

[73] Assignee: Frito-Lay, Inc., Dallas, Tex.

[21] Appl. No.: 682,904

[22] Filed: May 4, 1976

[51] Int. Cl.² .......................................... B23D 25/12
[52] U.S. Cl. .................................. 83/122; 83/333; 83/345; 83/670; 83/698
[58] Field of Search ................. 83/344, 345, 99, 167, 83/113–122, 665, 669, 670, 673, 698–700, 671, 674, 675, 333

[56] References Cited

U.S. PATENT DOCUMENTS

| | | | |
|---|---|---|---|
| 104,442 | 6/1870 | Garrick | 83/333 |
| 420,524 | 2/1890 | Wheeler | 83/345 |
| 1,258,569 | 3/1918 | Hugulet | 83/345 |
| 1,286,377 | 12/1918 | Malm | 83/300 |
| 1,464,309 | 8/1923 | Cumfer | 83/345 |
| 1,592,094 | 7/1926 | Funk | 83/665 UX |
| 1,756,119 | 4/1930 | Gill et al. | 83/345 X |
| 1,894,037 | 1/1933 | Harshberger | 83/122 |
| 2,145,048 | 1/1939 | Hagen | 83/346 X |
| 2,279,768 | 4/1942 | Ulrich | 83/98 X |
| 2,445,831 | 7/1948 | Hoffman et al. | 83/122 X |

Primary Examiner—J. M. Meister
Attorney, Agent, or Firm—Bernard & Brown

[57] ABSTRACT

Apparatus for cutting shaped articles from thin material. By way of example, the material can be uncooked dough and the articles can be preforms which are further processed into snack food chips. A rotary cutter includes a first roller having a cylindrical surface with a plurality of article cutters positioned around and projecting outwardly from the cylindrical surface. A second roller has plurality of trim cutters positioned around and projecting outwardly from it cylindrical surface. As the two rollers are rotated, the article cutters and the trim cutters are brought sequentially into shearing engagement to cut the material into articles and trim. Stripping fingers adjacent the outlet of the cutter bite, strip the articles and trim from the rollers for further processing. Preferably, the material is fed to the rollers as a ribbon, and the cutters cut the material into one or more ribbons of articles and ribbons of trim. The ribbons of articles can then be advanced for further processing and subsequent separation. Pressurized gas streams can be used to insure the removal of trim from the edges of the first roller.

6 Claims, 13 Drawing Figures

ROTARY CUTTING DEVICE FOR FORMING STRIPS OF SHAPED ARTICLE PREFORMS

The present invention pertains to the manufacture of shaped articles. More particularly, the present invention pertains to an apparatus for cutting shaped articles from a supply of solid, thin, relatively wide material, and, by way of example, the apparatus is particularly suited for the cutting of preforms for shaped snack food chips from uncooked dough material.

Snack foods, such as corn chips, have been popular for a number of years. In the manufacture of corn chips, a dough is made from corn and other ingredients, and this dough is generally processed into flat form, for example by forming a thin, relatively wide ribbon of the dough. Preforms of the desired shape are cut from the uncooked dough ribbon and are cooked, for example in a deep fat fryer. Mass production of such food chips requires that the preforms be cut automatically and rapidly from the dough. The preform shape and quality, of course, affect the shape and quality of the cooked corn chips. The preforms must be cut from the dough without tearing or stretching of the dough, or the cut food chips will be cooked unevenly and so be of poor quality, as well as being ragged and unappealing to the eye. A quantity of the cooked food chips is packaged in a container for sale. When the fried food chips are not uniformly shaped, they must be packaged in large containers for a given weight. To be economical, these containers must be relatively inexpensive, which generally means the food chips are subject to deterioration within a short period of time due to contact with air which is in or which leaks into the containers.

There are techniques of making food chips such as corn chips from dough in which the preforms are fried while physically restrained in a predetermined position, for example in a mold. The mold can have a curved shape which produces correspondingly curved chips, and uniformity of shape permits stacking and packaging in relatively small containers which can be made more or less air-tight. These chips when packaged in air-tight containers in an inert atmosphere deteriorate very slowly, and so the shelf-life of the product is improved. In addition, breakage of the chips is minimized by this type of packaging. The making of such chips with uniform shape requires that the preforms cut from the ribbon of dough be of uniform shape as initially cut and that the preforms be removed from the cutting apparatus without damage to the preforms. Additionally, the trim material, left after the preforms are cut, must be efficiently and effectively removed from the cutting apparatus.

There have been developed apparatus for cutting preforms from ribbons of dough for the purpose of manufacture into food chips. While such preforms can be individually cut for individual frying, they more efficiently can be made as a continuous ribbon of preforms which are then fried as a continuous ribbon and separated or broken into individual food chips after frying. While a continuous ribbon of preforms can be cut from a ribbon of dough by using equipment having a reciprocating action, this requires stopping the movement of the dough ribbon while the cutting takes place. Consequently, a reciprocating type cutter is relatively slow.

U.S. Pat. No. 3,872,752 shows apparatus for cutting a ribbon of preforms from a ribbon of dough. The ribbon of dough is passed between a cutter roller having a circumferential surface with a plurality of preform cutting ridges positioned around and projecting from the cylindrical surface, and a smooth roller against which the cutting ridges of the first roller impinge so that the preforms are cut by a pinching action. Openings in the cylindrical surfaces of the two rollers are coupled to a pneumatic system which exerts a vacuum during those portions of the rotation at which the ribbons are to adhere to the roller surfaces and which blows air outwardly during those portions of the rotation at which the ribbons are to be separated from the roller surfaces. Not only is the pinching cut undesirable, but also the pneumatic system is complex and subject to breakdown.

In the present invention the continuous cutting of preforms without substantial stretching or tearing of the solid, moving material being cut and without stopping the movement of the material, is advantageously done with a shearing action, i.e., an action causing two contiguous and attached sections of the material to slide relative to each other in opposite directions which are generally perpendicular to their direction of travel along the line of cutting. During the cutting of the articles care must be taken to assure that the material does not adhere to the cutter. In the cutting of a ribbon of preforms, any sticking of the material to the cutter is an even more serious problem than in the case of the cutting of separate individual preforms, since ideally the ribbon of preforms is automatically passed to another location for further processing, and sticking of the preforms to the cutter may result in the breaking or deforming of the ribbon of preforms, thus shutting down the operation, rather than merely disabling one cutter, as might happen where separate individual preforms are being cut.

U.S. Pat. No. 3,430,542 shows a rotary cutter for cutting separate articles from a ribbon of material. The rotary cutter includes first and second rollers each having a die plate encircling its cylindrical surface. Each die plate has a set of cutting edges extending therefrom, and the cutting edges of the two die plates engage to cut material therebetween with a shear cut. No means is provided to separate the cut articles or trim from the rollers; thus, should an article or a piece of trim adhere to a roller, proper operation is prevented. Additionally, should a cutting edge become worn or damaged, the entire die plate must be replaced.

The present invention is an apparatus for shear cutting articles from material and effectively removing the articles and the resulting trim from the cutter. Advantageously, the material is supplied to the cutting apparatus in the form of a ribbon. In preferred embodiments the apparatus cuts a ribbon of material into a continuous ribbon of articles and continuous ribbons of adjacent trim. By a ribbon of material is meant a continuous, moving supply of thin, relatively wide material, say, for example, material with a thickness in the order of about 0.050 inch or less, say down to about 0.010 or so, and a width in the order of from about 4 to about 15 inches. By way of illustration the material can be a ribbon of dough made from a farinaceous material, with the dough having, for example, a thickness in the order of about 0.025 inch and a width in the order of about twelve inches, and the articles can be preforms which are further processed into snack food chips. The preforms may be of various shapes, for example, substantially oval, and the preforms may have a major surface dimension in the order of say, about two to three inches and a minor surface dimension in the order of, say, about 1 to 2 inches. Thus, while the following detailed description generally refers to the present invention with reference to the cutting of ribbons of preforms and particularly preforms for snack food chips, this is illustrative only, and the present invention may be utilized in cutting other articles from suitable material. The apparatus provides a shearing type of cutting action, thus making it highly advantageous for the cutting of continuous ribbons of preforms. The apparatus further includes means for assuring that the preforms and the scraps or trim do not stick to the cutter but instead are removed from the cutter. In another aspect of the invention the surfaces which perform the shearing cut are provided as inserts on separate, cooperating rollers and can be readily replaced which provides convenience and flexiblity in using the apparatus. Preforms cut in accordance with the present invention from a ribbon of dough are suited for cooking in numerous manners, including cooking in a restrained position to provide snack food chips of uniform, curved shaped, if desired.

In accordance with the present invention, a rotary cutter is provided including a first roller having a cylindrical surface with a plurality of preform cutter inserts positioned around and projecting outwardly from the cylindrical surface, and a second roller having a cylindrical surface with a plurality of trim cutter inserts positioned around and projecting outwardly from that cylindrical surface. The two rollers are juxtaposed to define a bite into which the material to be cut is fed. As the two rollers rotate, the preform cutters and the trim cutters are brought sequentially into shearing or passing engagement to cut the ribbon of material into preforms and trim. Preferably, the preform cutters and the trim cutters engage so that the preforms are cut as one or more continuous ribbons and the adjacent trim is left as continuous ribbons. Means can be provided adjacent the outlet of the bite of the rollers to assure that the preform and trim ribbons are removed from the rollers so that the rollers can continue their cutting operation and the cut ribbons can be further processed. These means can include stripping fingers which cooperate with grooves in the roller surfaces to strip the cut ribbons therefrom. Advantageously, the apparatus can further include means for directing pressurized gas toward the edges of the cylindrical surface of one or both rollers, preferably the first roller, to aid in the separation of trim from the rollers.

These and other aspects and advantages of the present invention are more apparent in the following detailed description and claims, particularly when considered in conjunction with the accompanying drawings in which like parts bear like reference numerals. In the drawings:

Figure 1:
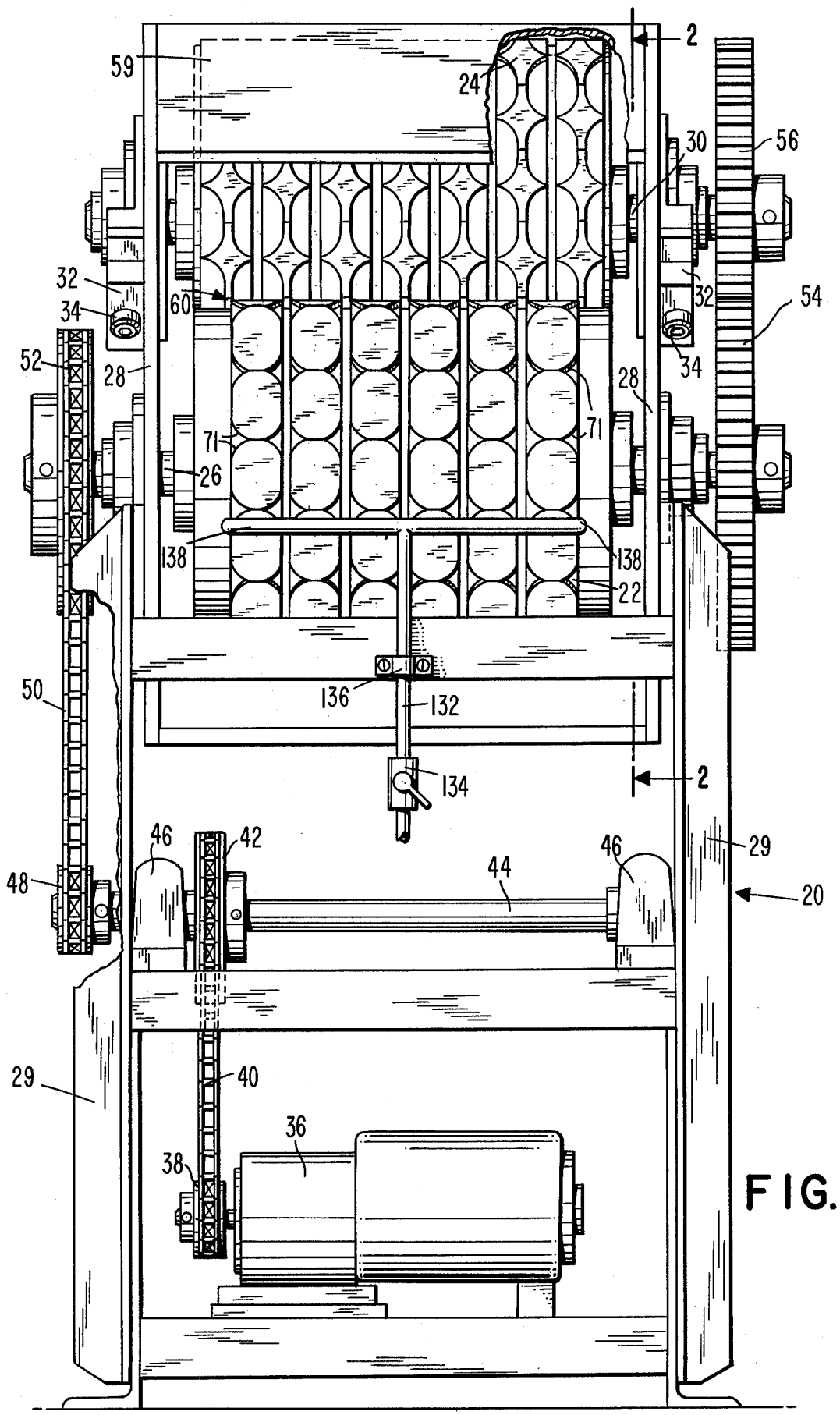
FIG. 1 is a front elevational view of a preferred embodiment of apparatus in accordance with the present invention.
Figure 2:
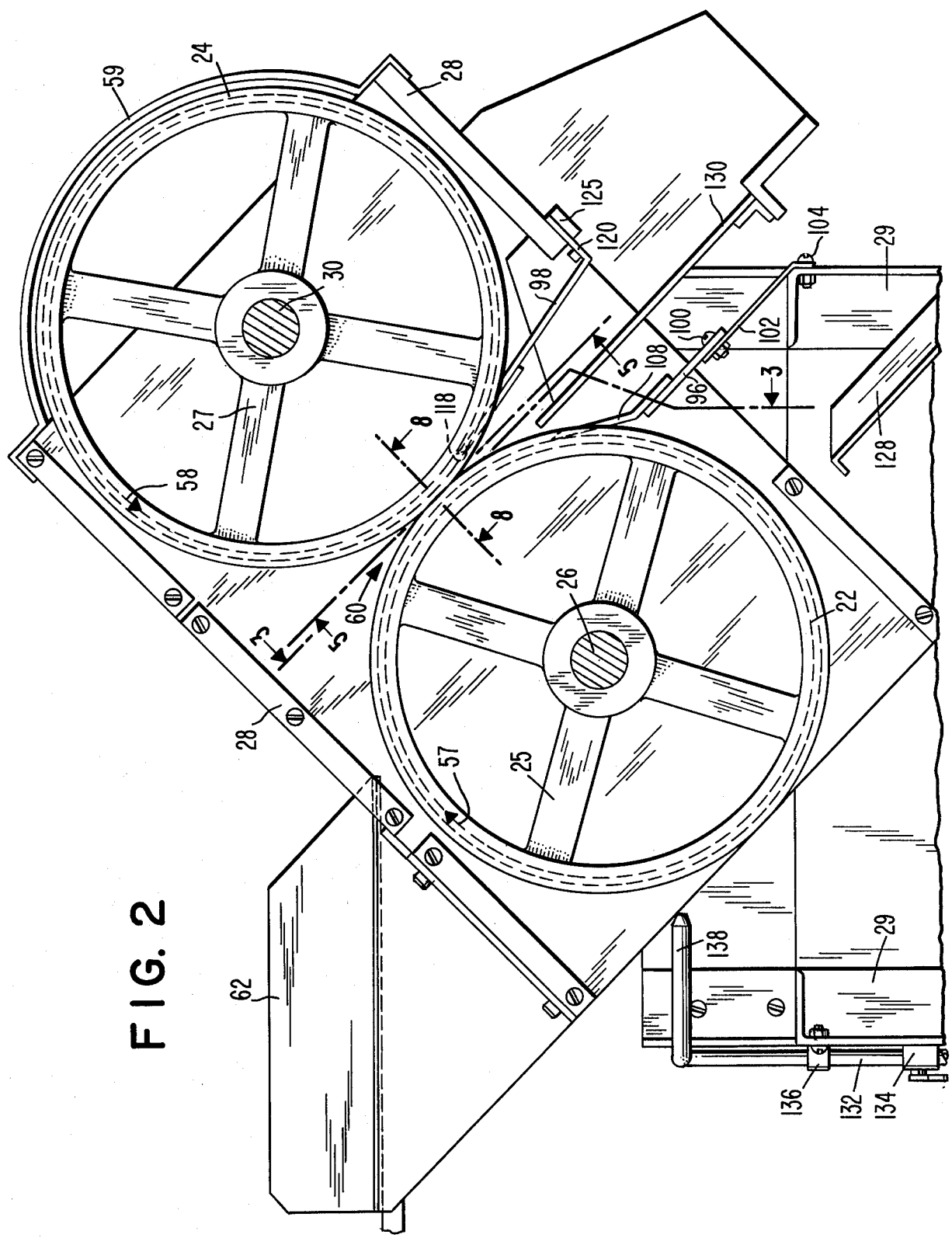
FIG. 2 is a fragmentary sectional view taken along line 2—2 of FIG. 1.

Rotary cutter 20, includes preform roller 22 and trim roller 24. As seen in FIGS. 1 and 2, preform roller 22 is mounted on shaft 26 which is suitably journalled at each end in frame member 28 for rotation. Frame member 28 is supported by support member 29 on a floor or other suitable surface. Trim roller 24 is mounted on shaft 30 which is suitably journalled by means including adjustable mounting blocks 32 for rotation on frame member 28. Mounting blocks 32 include adjustment means such as set screws 34 which permit adjustment of the relative spacing of preform roller 22 and trim roller 24.

A power source such as an electric motor 36 is mounted on support member 29 so that it drives sprocket 38. Drive chain 40 couples sprocket 38 to sprocket 42 fixedly mounted on shaft 44 which is rotatably mounted on support member 29 by bearing members 46. Sprocket 48 is also fixedly mounted on shaft 44 for rotation therewith. Drive chain 50 couples sprocket 48 with sprocket 52 which is fixedly mounted on shaft 26 of preform roller 22. First gear member 54 is also fixedly mounted on rotatable shaft 26 to mesh with second gear member 56 which is fixedly mounted on rotatable shaft 30 of trim roller 24. Consequently, motor 36 causes preform roller 22 and trim roller 24 to rotate at speeds determined by the relative diameters of sprockets 38, 42, 48, and 52, and gear members 54 and 56 cause rollers 22 and 24 to rotate properly, as indicated in FIG. 2 by arrows 57 and 58, to draw dough into their bite 60. Proper operation of rotary cutter 20 requires a continuous match between preform roller 22 and trim roller 24 as they rotate, and to this end gear members 54 and 56 preferably include appropriate anti-backlash features. If desired, the upper portion of trim roller 24 and the lower portion of preform roller 22 can be covered by shield means 59; however, the bite 60 of rollers 22 and 24 is open and accessible.

As seen in FIG. 2 feed tray 62 is positioned on frame member 28 to feed dough to bite 60 of rollers 22 and 24. Feed tray 62 has been omitted from FIG. 1 for clarity. FIG. 2 also illustrates the manner in which rollers 22 and 24 are rotatably supported, respectively, by spider members 25 and 27 on shaft 26 and 30.

Figure 3:
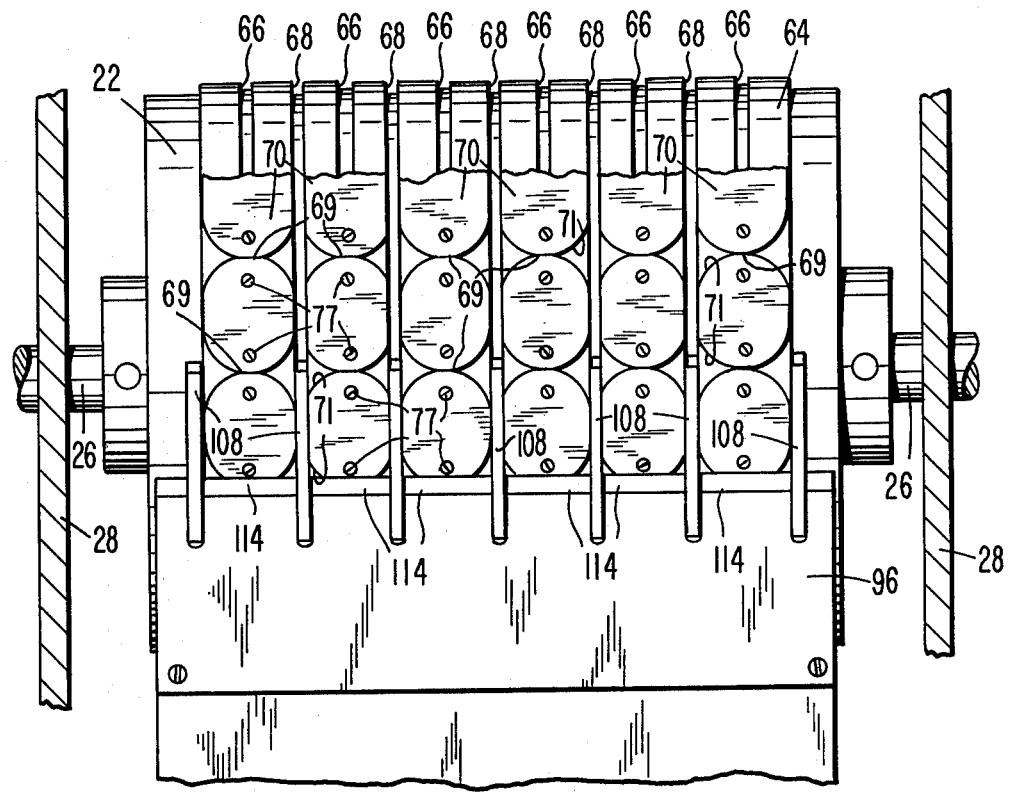
FIG. 3 is a fragmentary sectional view taken along line 3—3 of FIG. 2.
Figure 4:
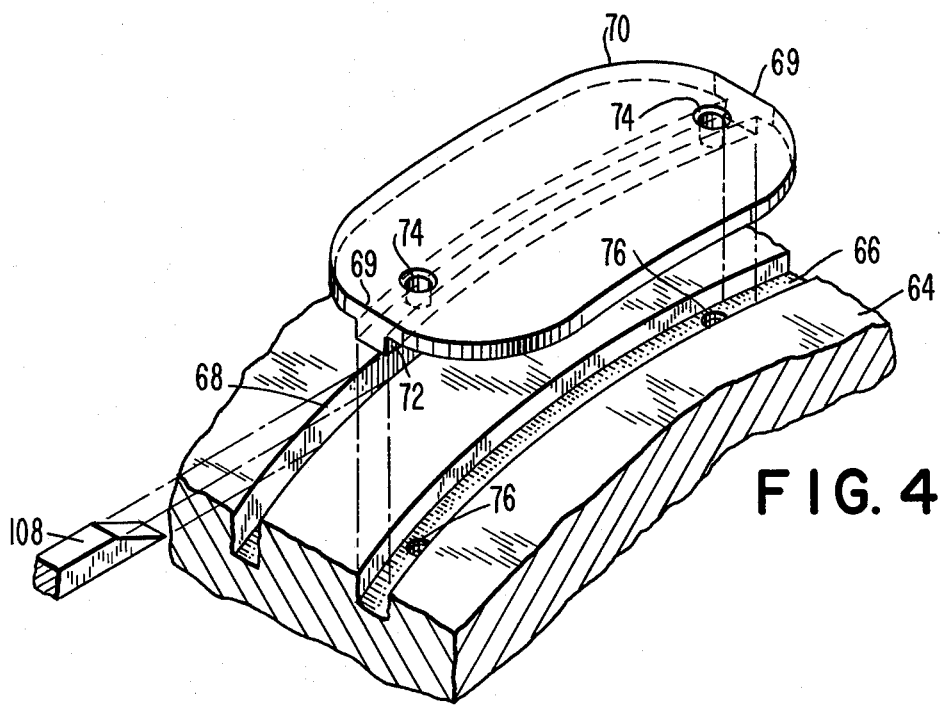
FIG. 4 is an enlarged fragmentary perspective view illustrating details of components shown in FIG. 3.

FIG. 3 shows the detail of preform roller 22. As there depicted, roller 22 is made up of a drum 64 the cylindrical surface of which includes a plurality of first circumferential grooves 66 which alternate axially on drum 64 with a plurality of second circumferential grooves 68. A plurality of preform cutter inserts 70 are positioned in abutting relationship around drum 64 along each of the first grooves 66. Typically eight preform cutter inserts 70 might fit circumferentially about each first groove 66, and there might be six first grooves 66 equally spaced over the axial length of drum 64 so that drum 64 has forty-eight preform cutter inserts 70 fastened to its surface. FIG. 4 illustrates a typical preform cutter insert 70 including rib 72 extending the length thereof from the under side thereof to fit within a first groove 66 to assure that each preform cutter insert 70 is properly aligned on drum 64. Holes 74, through the preform cutter inserts 70, and threaded holes 76, in the first grooves 66, permit the preform cutter inserts 70 to be fastened to drum 64 by means of bolts 77, as depicted in FIG. 3. Each preform cutter insert 70 is substantially the shape desired for the preforms, and, as depicted in FIG. 4, each preform cutter insert 70 might be substantially oval with flattened end areas 69 to abut the contiguous preform cutter insert 70. The dimensions of the preform cutter inserts are determined, of course, by the dimensions desired for the preforms. Oval preform cutter inserts 70 such as illustrated in FIG. 4 might have a major or longitudinal surface dimension in the order of about two to three inches and a minor or transverse surface dimension in the order of about 1 to 2 inches, with end area 69 having a width in the order of about one-eighth to five-eighths inch. The ratio of the minor surface dimension of the cutter inserts to the width of the end area may be, for example, at least about 2 or 3:1 up to about 8 to 10:1 or more, preferably about 3 to 6:1. As seen in FIG. 3, the preform cutter inserts 70 in any one groove 66 have their circumferential ends 69 in contact. Since the preform cutter inserts 70 project outwardly from the cylindrical surface of drum 64, recesses 71 are defined between the preform cutter inserts 70 and surrounding the second grooves 68.

Figure 5:
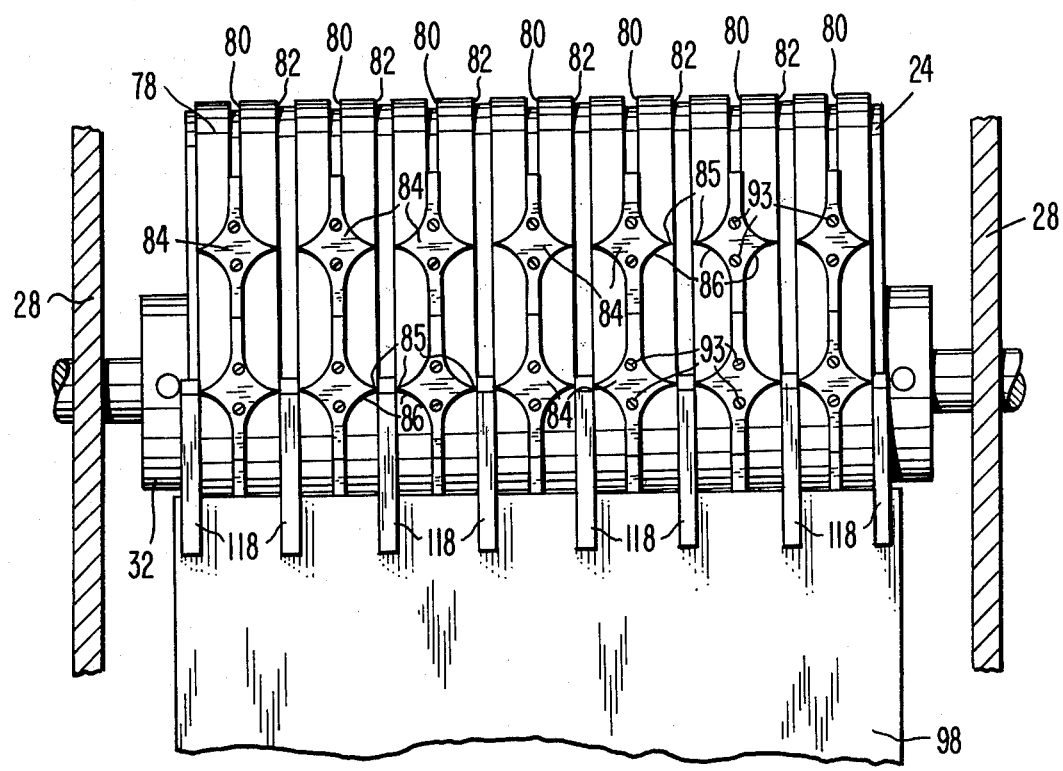
FIG. 5 is a fragmentary sectional view taken along line 5—5 of FIG. 2.

Similarly, FIG. 5 shows the detail of trim roller 24 which is made up of a drum 78 the cylindrical surface of which includes a plurality of first circumferential grooves 80 which alternate axially on drum 78 with a plurality of second circumferential grooves 82. A plurality of trim cutter inserts 84 are positioned around drum 78 along the first grooves 80. Each first groove 80 has a number of trim cutter inserts 84 equal to the number of preform cutter inserts 70 in each first groove 66 on drum 64 of FIG. 3. When preform roller 22 and trim roller 24 are mounted for operation, as depicted in FIG. 1, there is a first groove 66 on preform roller 22 aligned with each second groove 82 on trim roller 24, and there is a first groove 80 on trim roller 24 aligned with each second groove 68 on preform roller 22. There is an additional first groove 80 axially outwardly of each axially outermost second groove 82. Thus, the preform roller grooves 66 and 68 are spaced in relation to the first trim roll assembly grooves 80 and 82 so that at bite 60 there is a trim cutter insert 84 on each side of each preform cutter insert 70.

Figure 6:
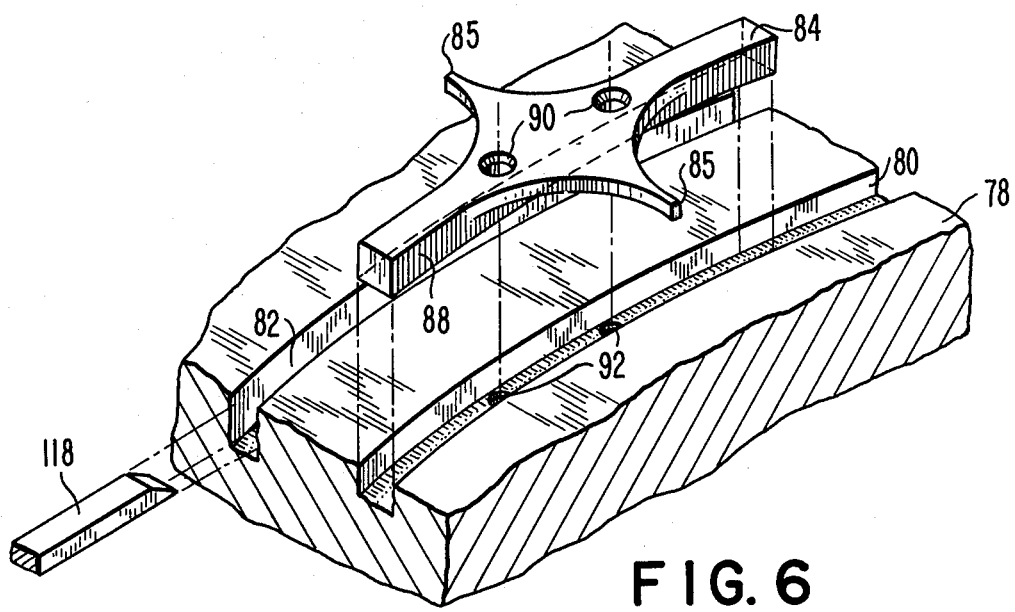
FIG. 6 is an enlarged fragmentary perspective view showing details of components shown in FIG. 5.

Each trim cutter insert 84 is the shape required to trim dough from between adjacent preform cutter inserts 70, and this shape generally matches the shape of recesses 71. When the preform cutter inserts 70 are of an oval shape as depicted in FIG. 4, then trim cutter inserts 84 have somewhat of a star shape as shown in FIG. 6. A typical trim cutter insert 84, illustrated in FIG. 6, includes rib 88 which extends the length thereof from the underside thereof to fit within a first groove 80 to assure that each trim cutter insert 84 is properly aligned on drum 78. Holes 90, through the trim cutter inserts 84, and threaded holes 92, in first grooves 80, permit the trim cutter inserts 84 to be fastened to drum 78 by means of bolts 93, as depicted in FIG. 5. Since the ends 69 of adjacent preform cutter inserts 70 are in contact, the axially extending ends 85 of axially adjacent trim cutter assemblies 84 are not in contact with each other, but instead terminate at a point allowing the trim cutter inserts 84 to cooperate in shearing engagement with the preform cutter inserts 70 which are mounted on preform roller 22 with the ends 69 abutting. The trim cutter inserts 84 are positioned around and project outwardly from the cylindrical surface of drum 78, as depicted in FIG. 5, and a plurality of recesses 86 are defined between the trim cutter inserts 84 to receive the preform cutter inserts 70 at the bite 60 of preform roller 22 and trim roller 24. The spacing of grooves 66 and 68 and grooves 80 and 82 and the sizes of preform cutter inserts 70 and trim cutter inserts 84 are such that preform cutter inserts 70 fit within recesses 86 and trim cutter inserts 84 fit within recesses 71 with sufficient clearance to permit smooth operation. The amount of this clearance is dependent, to an extent at least, upon the thickness of the ribbon of material being cut. By way of example, if preforms for food chips are being cut from uncooked dough with a thickness of about 0.020 inch to about 0.025 inch, then there might be clearance in the order of about 0.0055 inch between adjacent cutter inserts at bite 60.

Figure 7:
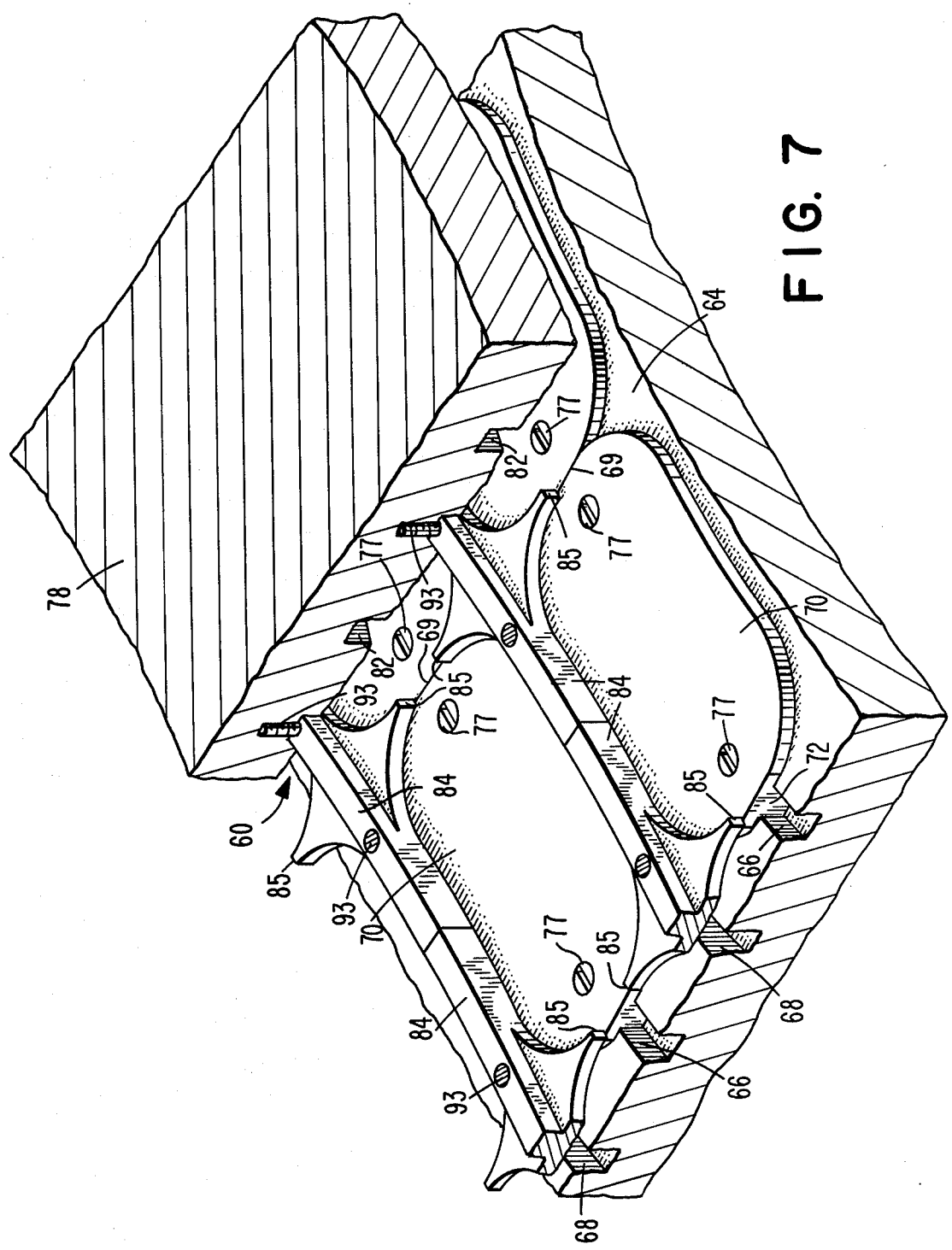
FIG. 7 is a fragmentary, broken perspective view illustrating the cutter bite of the apparatus of FIG. 1.
Figure 8:
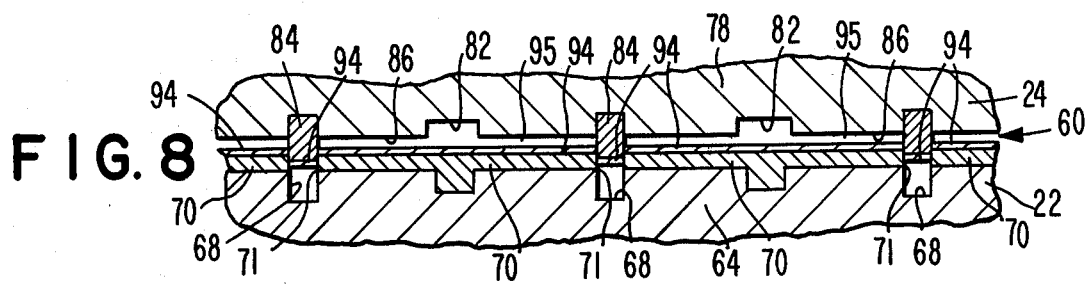
FIG. 8 is a fragmentary sectional view taken along line 8—8 of FIG. 2.

FIG. 7 illustrates the manner in which the preform cutter inserts 70 and the trim cutter inserts 84 cooperate in shearing engagement at the bite 60 of preform roller 22 and trim roller 24. As can be seen in FIG. 7, a trim cutter insert 84 is on each side of each preform cutter insert 70 at bite 60, and the preform cutter inserts 70 and trim cutter inserts 84 meet in shearing engagement at bite 60 to cut preforms of the desired shape from dough without stretching or tearing of the dough. FIG. 8 is a cross-sectional view showing the dough 94 as cut at bite 60 by the shearing action of preform cutter inserts 70 and trim cutter inserts 84. FIGS. 7 and 8 also illustrate the manner in which the second circumferential grooves 68 in drum 64 overlie trim cutter inserts 84 and the second circumferential grooves 82 in drum 78 overlie preform cutter inserts 70 at bite 60.

Note that, as shown in FIG. 8, preform roller 22 and trim roller 24 are spaced apart at bite 60 an amount somewhat greater than the thickness of dough 94 so that a space 95 exists in each recess 86 between dough 94 and the drum 78 surface of trim roller 24. Additionally, free space remains in grooves 68 and 82, as depicted in FIG. 8. The depth of free space 95 can be adjusted by adjusting set screws 34. Preform cutter inserts 70 and trim cutter inserts 84 can be sharpened as needed by removing the inserts from drums 64 and 78 and grinding the inserts. Upon reassembly, the spacing between preform roller 22 and trim roller 24, and thus the depth of free space 95, can be adjusted by means of set screws 34. Likewise, the preform cutter inserts 70 and trim cutter inserts 84 can readily be removed and replaced, should that be needed, and inserts of various shapes can be utilized to cut various shapes of preforms.

Figure 9:
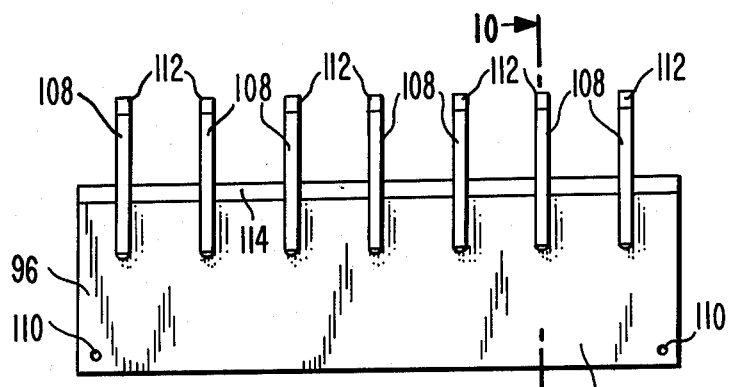
FIG. 9 is a plan view of one of the sets of stripping fingers of the apparatus of FIG. 1.
Figure 10:
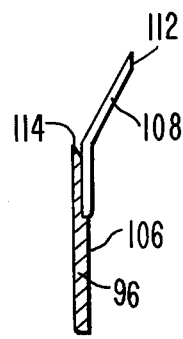
FIG. 10 is a sectional view taken along line 10—10 of FIG. 9.

The cut dough may tend to adhere to preform roller 22 or to trim roller 24 or to both, generally within the recesses 71 and 86. Lower roll dough stripper 96 and upper roll dough stripper 98, depicted in FIG. 2, strip the dough from these recesses. FIGS. 9 and 10 show the details of lower roll dough stripper 96. As seen there, the lower roll dough stripper 96 includes a body portion 106 and a plurality of fingers 108, equal in number to and the proper width to fit within second grooves 68 in drum 64. Holes 110 are provided adjacent the rearward corners of body portion 106 and outside the path of the preforms and trim to permit attachment of lower roll dough stripper 96 to mounting member 102 by means of nut and bolt assemblies 100, as depicted in FIGS. 2. Mounting member 102, in turn, is fastened to support member 29 by means such as nut and bolt assemblies 104. As seen in FIGS. 9 and 10, the forward tip 112 of each finger 108 is beveled. Likewise, the forward edge 114 of body portion 106 is beveled. As seen in FIG. 2, the fingers 108 are positioned with tips 112 within second grooves 68 of drum 64, while, as depicted in FIG. 3, the forward edge 114 overlies the preform cutter inserts 70 on drum 64.

Figure 11:
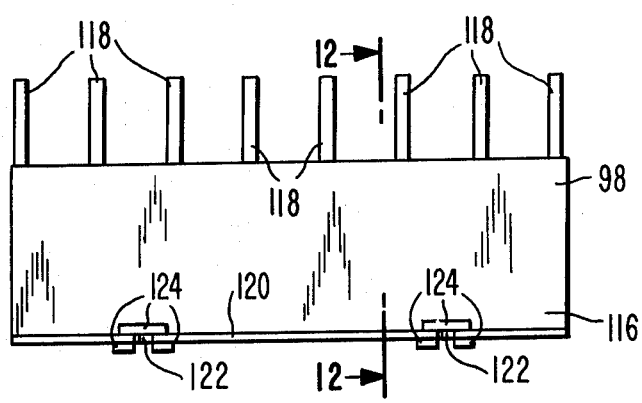
FIG. 11 is a plan view of the other set of stripping fingers of the apparatus of FIG. 1.
Figure 12:
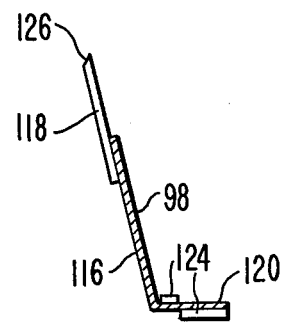
FIG. 12 is a sectional view taken along line 12—12 of FIG. 11.
Figure 13:
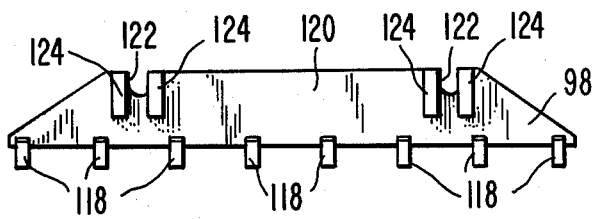
FIG. 13 is a elevational view of the stripping fingers of FIG. 11.

FIGS. 11, 12 and 13 show details of upper roll dough stripper 98 which includes a body portion 116 and a plurality of fingers 118, equal in number to and the proper width to fit within second grooves 82 of drum 78. To permit attachment of upper roll dough stripper 98 onto frame member 28, body portion 116 is angled to provide an attachment portion 120. Slotted openings 122 are provided in portion 120 to permit attachment and alignment of upper roll dough stripper 98 on frame member 28, by means of nut and bolt assemblies 125 depicted in FIG. 2. Reinforcement members 124 are positioned around openings 122. The tip 126 of each finger 118 has its lower edge beveled. As seen in FIG. 2, fingers 118 are positioned with tips 126 within second grooves 82 of drum 78. Thus as depicted in FIG. 5, fingers 118 overlie recesses 86. As can be appreciated from FIGS. 2, 3, 4, 5, 6 and 8, since grooves 68 and 82 overlie the trim cutter inserts 84 and the preform cutter inserts 70, respectively, stripping fingers 108 and 118 cooperate to strip the preforms and trim from drums 64 and 78 as the preforms and trim emerge from bite 60.

Looking again at FIG. 2, as dough is cut by the shearing action of preform cutter inserts 70 and trim cutter inserts 84, the fingers 108 assure that the trim is lifted from recesses 71 on the surface of preform roller 22 and is discharged along tray 128 which is mounted on frame member 29. Simultaneously, fingers 118 assure that the preforms are lifted from the recesses 86 on roller 24 to pass onto discharge tray 130 which is also attached to frame member 29.

Should any of the dough remain within recesses 71 or 86, is can generally be blown away by a gas stream. This is most likely to occur on the axially outermost trim ribbons at the side extremities of preform roller 22. The trim ribbons at those locations may not be fully removed from the recesses 71 of preform roller 22 by the action of lower roll dough stripper 96. Gas inlet line 132, shown in FIGS. 1 and 2, is coupled through a valve 134, such as a manual valve, to a suitable source of pressurized gas, such as pressurized air. Inlet line 132 is preferably mounted to frame member 28 by suitable means such as mounting bracket 136. Inlet line 132 terminates in one or more nozzles 138 positioned adjacent areas of preform roller 22 and trim roller 24 at which dough is likely to require removal even after passage past dough strippers 96 and 98. Thus, FIGS. 1 and 2 illustrate a nozzle 138 positioned adjacent each axially outermost line of recesses 71 of preform roller 22. Should dough remain there, gas from nozzles 138 removes such dough.

To summarize the operation of the rotary cutter of the present invention, particularly with reference to FIGS. 1 and 2, motor 36 causes preform roller 22 and trim roller 24 to rotate, bringing the preform cutter inserts 70 and the trim cutter inserts 84 sequentially into shearing engagement at bite 60. A ribbon of dough 94 travels from feed tray 62 to bite 60 of rollers 22 and 24. The shearing action of preform cutter inserts 70 and trim cutter inserts 84 cuts ribbons of preforms from the ribbon of dough 94 and leaves ribbons of trim. Strippers 96 and 98, together with gas nozzles 138, assure that the ribbons of preforms and trim are removed from rollers 22 and 24. The ribbons of trim pass via discharge tray 128 for recycling or for scrap, while the ribbons of preforms pass via discharge tray 130 for further processing.

Although the present invention has been described with reference to a preferred embodiment, rearrangements and alternations could be made within the scope of the invention.

What is claimed is:

1. Apparatus for cutting a plurality of ribbons of article preforms having a desired shape and a plurality of ribbons of trim from a thin, wide ribbon of material, comprising a first roller and a second roller rotatably mounted juxtaposed to each other with their axes parallel, said first and second rollers defining a bite between their cylindrical surfaces;

a plurality of article cutter inserts, said first roller having a plurality of spaced-apart article insert grooves extending around the circumference and on the cylindrical surface thereof, said article cutter inserts being removably mounted in said article insert grooves in abutting position to provide a plurality of rows of article cutter inserts projecting from the surface of said first roller and extending circumferentially therearound, each of said plurality of rows of article cutter inserts having opposed, undulating cutting edge sides defining the desired shape of said ribbons of article preforms;

a plurality of trim cutter inserts, said second roller having a plurality of spaced-apart trim insert grooves extending around the circumference and on the cylindrical surface thereof, said trim cutter inserts being removably mounted in said trim insert grooves in abutting position to provide a plurality of rows of said trim cutter inserts projecting from the surface of said second roller and extending circumferentially therearound, each of said plurality of rows of trim cutter inserts having opposed undulating sides forming cutting edges which are spaced apart and extend circumferentially around said second roller, and are shaped to closely, interfittingly receive said cutting edges of said article cutter inserts at the bite of said first and second rollers, and said article insert grooves and said trim insert grooves being arranged on said first and second rollers so that said circumferential rows of article cutter inserts and said circumferential rows of trim cutter inserts cooperate with each other at said bite to be brought into shearing engagement at said bite upon rotation of said first and second rollers for cutting a ribbon of material introduced into said bite into transversely alternating ribbons of article preforms and ribbons of trim;

means for rotating said first and said second rollers to pass said article cutter inserts forming each of said plurality of circumferential rows of article cutter inserts, and said trim cutter inserts forming each of said plurality of circumferential rows of trim cutter inserts through said bite so that mating ones of said article cutting edges and said trim cutting edges are brought into shearing engagement to thereby cut a ribbon of material fed to said bite into said ribbons of articles and said ribbons of trim.

2. Apparatus for cutting a plurality of ribbons of article preforms having a desired shape and a plurality of ribbons of trim from a thin, wide ribbon of material, comprising a first roller and a second roller rotatably mounted juxtaposed to each other with their axes parallel, said first and second rollers defining a bite between their cylindrical surfaces;

a plurality of article cutter inserts, said first roller having a plurality of spaced-apart article insert grooves extending around the circumference and on the cylindrical surface thereof, said article cutter inserts being removably mounted in said article insert grooves in abutting position to provide a plurality of rows of article cutter inserts projectig from the surface of said first roller and extending circumferentially therearound, each of said plurality of rows of article cutter inserts having opposed, undulating cutting edge sides defining the desired shape of said ribbons of article preforms;

a plurality of trim cutter inserts, said second roller having a plurality of spaced-apart trim insert grooves extending around the circumference and on the cylindrical surface thereof, said trim cutter inserts being removably mounted in said trim insert grooves in abutting position to provide a plurality of rows of said trim cutter inserts projecting from the surface of said second roller and extending circumferentially therearound, each of said plurality of rows of trim cutter inserts having opposed undulating sides forming cutting edges which are spaced apart and extend circumferentially around said second roller, and are shaped to closely, interfittingly receive said cutting edges of said article cutter inserts at the bite of said first and second rollers, and said article insert grooves and said trim insert grooves being arranged on said first and second rollers so that said circumferential rows of article cutter inserts and said circumferential rows of trim cutter inserts cooperate with each other at said bite to be brought into shearing engagement at said bite upon rotation of said first and second rollers for cutting a ribbon of material introduced into said bite into transversely alternating ribbons of article preforms and ribbons of trim;

means for rotating said first and said second rollers to pass said article cutter inserts forming each of said plurality of circumferential rows of article cutter inserts, and said trim cutter inserts forming each of said plurality of circumferential rows of trim cutter inserts through said bite so that mating ones of said article cutting edges and said trim cutting edges are brought into shearing engagement to thereby cut a ribbon of material fed to said bite into said ribbons of articles and said ribbons of trim;

stripping means for stripping said ribbons of article preforms and said ribbons of trim from said first and second rollers, said stripping means comprising trim stripping means for removing said ribbons of trim from said first roller as said rollers rotate including a plurality of spaced-apart circumferential trim stripping grooves extending around said first roller cylindrical surface and positioned to overlie said plurality of trim cutter inserts at said bite and a trim stripping finger extending into each of said plurality of trim stripping grooves on the cut material outlet side of said bite; and article stripping means for removing said ribbons of article preforms from said second roller as said rollers rotate including a plurality of spaced-apart circumferential article stripping grooves extending around said second roller cylindrical surface and positioned to overlie said article cutter inserts at said bite and an article stripping finger extending into each of said plurality of article stripping grooves on the cut material outlet side of said bite;

said trim stripping fingers and said article stripping fingers being arranged to remove, respectively, said ribbons of trim and said ribbons of article preforms from said first and second rollers as said rollers rotate.

3. Apparatus as claimed in claim 2 further comprising feed tray means for supporting the ribbon of material as it is fed to said bite.

4. Apparatus as claimed in claim 3 further comprising discharge tray means for receiving said ribbons of article preforms upon discharge from said bite.

5. Apparatus as claimed in claim 4 further comprising second discharge tray means for receiving said ribbons of trim upon discharge from said bite.

6. Apparatus as claimed in claim 1 further comprising means for blowing a stream of gas onto the edge of the cylindrical surface of said first roller on the material discharge side of said bite to remove cut material therefrom.

* * * * *